United States Patent [19]
Weber et al.

[11] Patent Number: 5,187,097
[45] Date of Patent: Feb. 16, 1993

[54] COMPOSTING SYSTEM AND COMPOSTING METHOD

[75] Inventors: Heinrich Weber; Falko Lehrmann, both of Oberuzwil; Hermann Hofer, Niederuzwil, all of Switzerland; Werner Vogel, Lauterach; Peter Mueller, Rankweil, both of Australia

[73] Assignee: Buehler AG, Uzwil, Switzerland

[21] Appl. No.: 498,270

[22] Filed: Mar. 23, 1990

[30] Foreign Application Priority Data

Mar. 28, 1989 [CH] Switzerland ............ 1119/89
Mar. 1, 1990 [CH] Switzerland ............ 630/90

[51] Int. Cl.$^5$ ............ C12M 1/04; B65G 65/02; B65G 15/26
[52] U.S. Cl. ............ 435/313; 435/287; 422/184; 71/9; 198/507; 198/508; 198/509; 198/519; 198/520; 198/594; 198/812
[58] Field of Search ............ 435/313, 310, 287; 422/111, 184, 233; 71/9; 198/507–509, 519, 520, 588, 594, 812

[56] References Cited

U.S. PATENT DOCUMENTS

| | | | |
|---|---|---|---|
| 3,435,967 | 4/1969 | Sackett | 198/594 |
| 3,530,973 | 9/1970 | Rossi | 198/594 |
| 4,053,997 | 10/1977 | Stuller et al. | 198/520 |
| 4,134,731 | 1/1979 | Houser | 435/209 |
| 4,139,640 | 2/1979 | Kipp, Jr. | 426/55 |
| 4,378,886 | 4/1983 | Roediger | 435/287 |
| 4,397,674 | 8/1983 | Laughbaum | 71/9 |
| 4,410,348 | 10/1983 | Ito et al. | 71/9 |
| 4,559,073 | 12/1985 | Minato et al. | 71/9 |
| 4,643,299 | 2/1987 | Calundan | 198/812 |
| 4,777,138 | 10/1988 | Levasseur | 435/306 |
| 4,795,711 | 1/1989 | Nockemann | 435/316 |
| 4,828,399 | 5/1989 | Pacentino et al. | 366/345 |
| 4,869,877 | 9/1989 | Sellew et al. | 422/111 |

FOREIGN PATENT DOCUMENTS

| | | |
|---|---|---|
| 0060410 | 9/1982 | European Pat. Off. . |
| 0244391 | 11/1987 | European Pat. Off. . |
| 0250617 | 1/1988 | European Pat. Off. . |
| 1431830 | 10/1968 | Fed. Rep. of Germany . |
| 2302882 | 7/1974 | Fed. Rep. of Germany . |
| 2236933 | 2/1975 | France . |
| 421159 | 3/1967 | Switzerland . |

Primary Examiner—Robert J. Warden
Assistant Examiner—T. A. Trembley
Attorney, Agent, or Firm—McAulay Fisher Nissen Goldberg & Kiel

[57] ABSTRACT

The disclosure is directed to a large composting system as well as to a new composting method for the automatic production of compost. A mobile layer rearranging unit includes a conveyor system which is changeable with respect to length can be remote-controlled so that the influx of rotting matter is optimized according to throughput and rotting time and the rot loss is compensated for by repeatedly restoring the complete rot height. The required space requirement is less than before. Any mechanical intervention has a loosening effect, particularly in that the working device comprises upwardly working digging and conveyor wheels. All important parameters for the compost ripening can be monitored via free programming as well as by control by the system maintenance personnel.

20 Claims, 6 Drawing Sheets

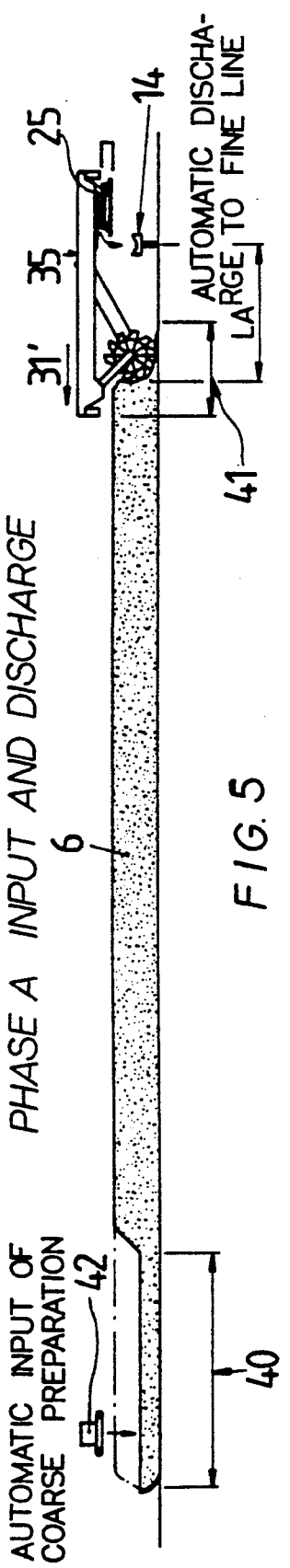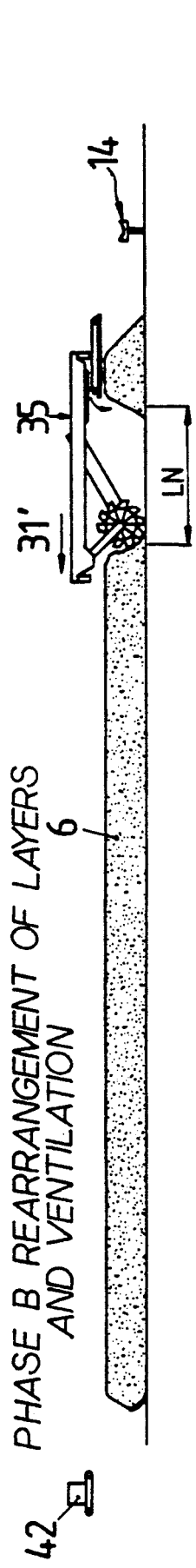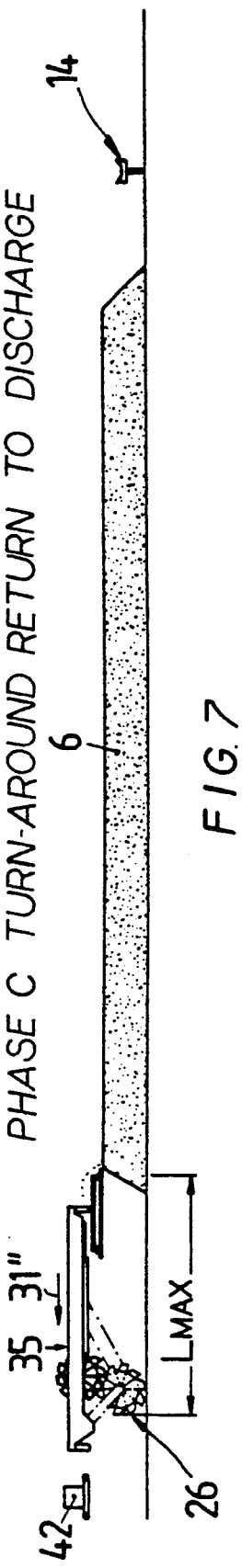

COMPOSTING SYSTEM AND COMPOSTING METHOD

BACKGROUND OF THE INVENTION

1. Field of the Invention

The invention is directed to a composting system for the production of compost of different degrees of ripeness by means of repeated rearrangement of the layers of a tabular stack comprising a layer rearranging unit which is movable longitudinally and transversely over the surface of the rotting matter, as well as to a composting method.

2. Background Prior Art

Compost production went has gone through a number of marked phases of development. Composting has been a favorite pastime of the garden owner since the start of this century. These garden owners put garden and kitchen waste, as valuable materials, back into the natural cycle again. The building up and rearrangement of the layers of the compost stacks is effected manually, wherein a great number of methods, ingredients, time cycles, etc. have been and are presently being devised and recommended.

The pressure to reclaim so-called "waste" collected by the public which is suitable for composting soon forced a mechanization for the large quantities of compost which could no longer be managed manually. After the war, there developed a tendency to use devices resembling construction machinery for the production and rearrangement of layers of the stacks, even in the form of known tractor shovels.

Since the ripening of compost is a predominantly biological process, a corresponding failure was "preprogrammed", as it were, by the mechanized approach and corresponding handling of compost materials with tractor shovels. The compost soil obtained was for the most part so unacceptable that in many places the public to this day refuses to produce compost.

Subsequently, technical circles made efforts to find a biologically more expedient preparation of compost. In order to keep process costs low, a multitude of intensively forced biological decomposition processes were developed. However, the proposed bio-reactors were not widely used.

The recent past has been characterized by two solutions, analogous in themselves. The first, more for small plants, again makes use of the long-known triangular stacks. Layers are rearranged in the latter with shifting equipment. In so doing, any unnecessary pressing of the product is avoided; on the contrary, the product is loosened anew every time it is shifted. The great advantage to this method consists in that the compost system maintenance personnel can influence the course of rotting to a great extent just as expediently by means of selecting the height of the stacks, layer rearranging cycles, water supply, mixing with different materials, etc. However, this advantage is simultaneously also a chief disadvantage. Optimal management of rotting matter places great demands on the responsible technicians in charge of management and accordingly requires a high level of training. As is known, the working conditions in the environment of the rotting matter are unpleasant, particularly because of the odor, so that there are few cases in which persons possessing the necessary professional requirements are also prepared to do this work. The persons must possess either great practical talent, e.g. an experienced gardener, or extensive knowledge of biology. Present efforts consist in producing compost in a biologically correct manner, but in an extensively mechanized manner. The objection is raised that the corresponding mechanical solutions, e.g. according to EP-PS 250 617, do not adequately take into account the biological cycles. The biological process during the main rotting results in a reduction in volume of up to 50% within several weeks. The emission of odors must be prevented particularly when systems are erected in the neighborhood of human settlements. This requires a complete enclosure of the composting system as well as cleaning of the exhaust air. For improved control of the biological decomposition, it is often advantageous to aerate the rot system in addition, so that such plants require relatively large investment. If the primary stack is piled up e.g. to a height of 2.5 m in the first area of the rotting matter, the rot loss results in a stack height of 1.25 m when the compost is ripe. In this way, poor use is made of the expensively enclosed space. Accordingly, this type of mechanized operation has the same disadvantages with respect to the aforementioned mechanical rearrangement of layers by the system maintenance personnel.

The invention has the object of avoiding the disadvantages of the known solutions, particularly of making possible a favorable specific utilization of surface area with operation which is as completely automatic as possible with simultaneous optimal biological management of the compost ripening. What is desired is an optimal combination of the best scientific knowledge on the one hand with the more empirical experience of practical technical personnel.

The solution, according to the invention, is characterized in that the layer rearranging unit is constructed as a conveyor system which can be changed with respect to length and can be moved over the rotting matter in the manner of a crane in such a way that the working distance between the working and ejection locations is changeable and is selectable via a control, wherein the working device comprises working means which work in an upward direction and can be raised and lowered.

The present invention meets this object with surprisingly simple means in a manner previously considered impossible. As is known, any use of automation in biological processes is of little use or is only harmful when the occurring biological processes and physical consequences are not adequately taken into account. A programming only makes sense when the means used for carrying it out can be used in a correspondingly directed manner with respect to their manner of operation. It is precisely this point which is first made possible with the present invention in that the working and ejection locations are freely selectable within a required range of choice by means of the longitudinal displaceability of the conveyor system. However, a particular advantage of the invention accordingly consists in that the rearrangement of layers of the rotting matter is controllable according to a predetermined plan, particularly in such a way that e.g. the rot loss can be compensated for automatically, that is, the collapsed "old stack" can be piled up again to a height like that at the beginning.

Optimal programs according to season and product can be repeated at any time and a continuous improvement of the monitoring of the ripening process is achieved in this way. Depending on the throughput capacity determined by the rotting, season, product humidity and temperature, etc., a determined basic program can be entered and continuously adapted to the instantaneous given conditions in operation, whether this be a matter of adjusting the time cycle, optimizing the supply air or irrigation quantities, or completely utilizing the maximum height when there is a great amount of raw material. Corresponding programs can be designed in such a way that the rot can act as a buffer for fluctuations from one delivery quantity to another, wherein the flow can be influenced at any time by direct intervention of the system maintenance personnel. The "product handling" is effected in an extremely careful manner in that the working elements work with conveyor means operating in an upward direction. This results in a loosening of the material. The material is lifted with the slightest possible pressure, displaced horizontally and released in a downward direction. The conveyors can be inclined, in particular a first conveyor which takes over the rotting matter from the working elements. It is essential that the ejection is horizontally displaceable independent of the working location at least in one conveyor. For reasons relating to energy as well as for practical considerations, every unnecessary vertical conveying and, in the ejection location, every unnecessary drop height should be avoided. In general, the working is effected from the bottom to the top, the erection of the following stack is effected from the top.

The invention allows a number of particularly advantageous design ideas. For example, a shifting area between the working and ejection locations is selected within Lmin and Lmax by means of the longitudinal displaceability of the conveyor system, wherein the ratio Lmin:Lmax is 1:1.2 to 1:3, preferably 1:1.5 to 1:2.5, particularly preferably approximately 1:2.

Accordingly, in most cases, the rot loss can be completely compensated for in that the material is brought from a great distance and then piled up higher again. A particularly great number of practical advantages result when two horizontal conveyors are provided which are longitudinally displaceable relative to one another.

The rotting matter working device can be constructed as an upwardly conveying scraper conveyor. In this design idea all horizontal conveyors can actually be installed in a horizontal position, which is simpler in terms of construction for longitudinal displacement. It is particularly preferred that the rotting matter working device be constructed as a bucket conveyor, particularly as digging and conveyor wheels working in an upward direction. At present the optimal form for garden waste, household compost and leaf material consists therein; the rotting matter working device is preferably constructed as a double-digging and conveyor wheel. On the other hand, a scraper conveyor is more suitable when largely vegetable materials which tend to cling together must be processed.

It is further suggested with the new invention solution to provide a continuous-flow weighing system for the rotting matter in the area of the horizontal conveyor, wherein this is constructed as a continuous-flow weighing system or as a belt weigher. The belt weigher can be integrated in a horizontal conveyor.

The weighing system simultaneously has several great advantages. In addition to measuring humidity, it serves as the main element of the sensing arrangement for an accurate feeding of water. Further, it reinforces the automatic monitoring of the system, since the latter can normally be operated without operators. The rearrangement of layers can be monitored together with the respective layer rearranging performance by means of measuring the power consumption for the working device. It is advantageous that a continuous water content measuring device be assigned, as well as a liquid feed device for controlled addition of liquid. The liquid feed is advisably effected in the area of the ejection location.

Another substantial design idea consists in that the ejection location is constant in the longitudinal direction in an end area of the rotting system and the working location is selectable according to the working process. In this way one of the most important advantages of the new invention solution is usable not only in the rearrangement of layers, but likewise when discharging from the rotting system.

The rotting matter is defined in a manner known per se by two longitudinal walls, and the rotting matter working device, with the horizontal conveyor as layer rearranging unit, is longitudinally and transversely movable in the manner of a crane according to the preselected program. It is further suggested that the floor of the rot system comprise a plurality of individually controllable ventilation fields, that the rot system be roofed in, and that the exhaust air from the rot system can be cleaned via a bio-filter. All of the rotting matter can accordingly be monitored completely automatically. Human intervention in the interior is only necessary sporadically, during disturbances, for checking and for all kinds of adjustments. The system maintenance personnel can intervene at any time according to their judgement. Scientific knowledge can be made use of at any time for periodic improvement of the basic programming.

The invention is further directed to a new composting method for the automatic production of compost, wherein the rearrangement of layers and the discharge of the compost is effected along the rotting matter location in the manner of a crane and is characterized in that the working and ejection locations are programmable along the rotting matter location in the transverse and longitudinal directions in such a way that the rotting cycle is optimized according to the throughput capacity and rotting time, and the rot loss can be successively compensated for in such a way that the entire process is controllable in a fully automatic manner.

It is especially preferable that the building up of the rotting matter and the primary stack, respectively, likewise be controlled, but this is effected using independent mechanical means.

For a better understanding of the present invention, reference is made to the following description and accompanying drawings while the scope of the invention will be pointed out in the appended claims.

BRIEF DESCRIPTION OF THE DRAWINGS

In the drawings

FIGS. 5, 6, 7 show different stages in the rearrangement of layers of a compost rot;

DESCRIPTION OF THE PREFERRED EMBODIMENTS

Figure 1:
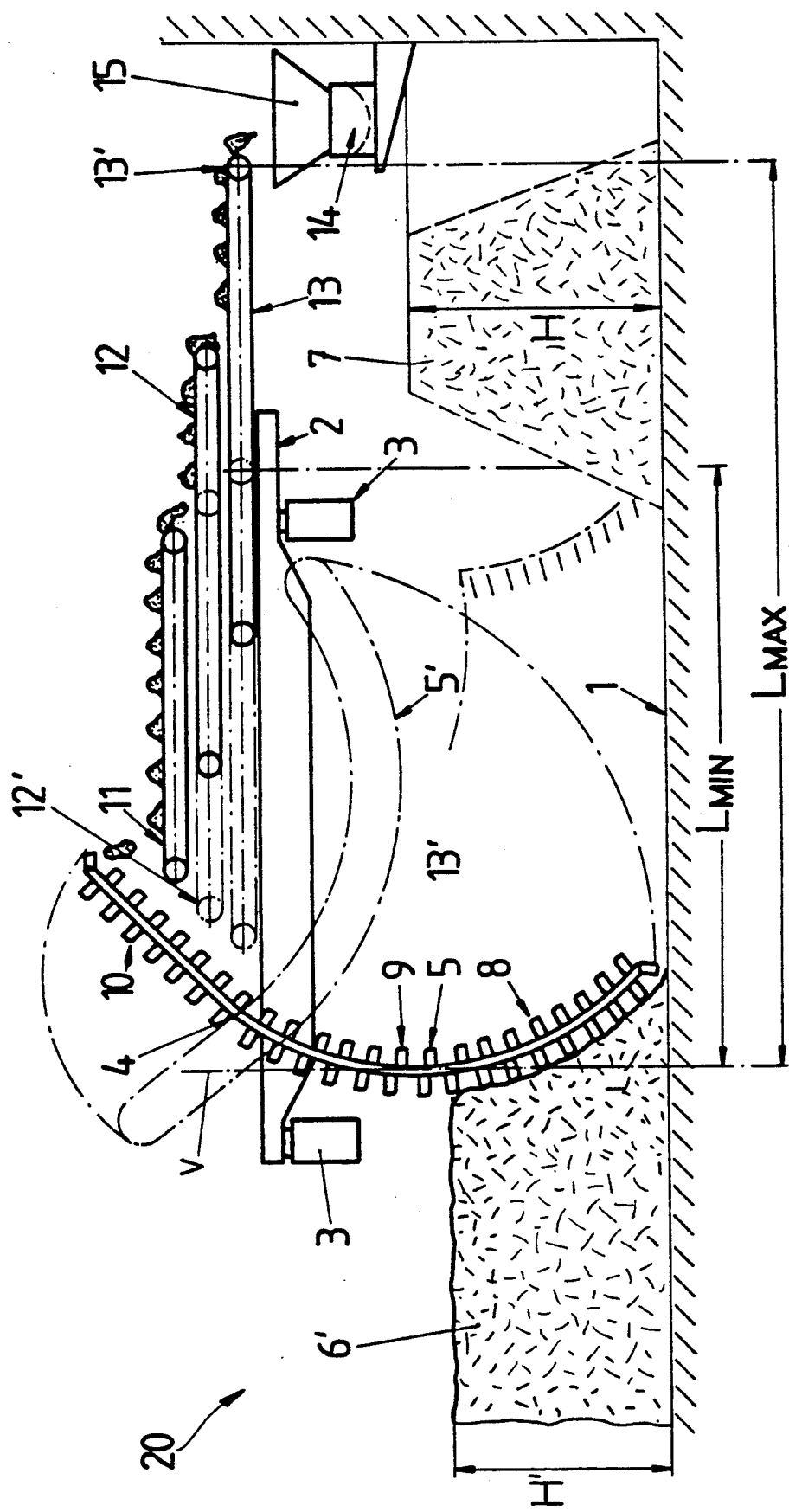
FIG. 1 shows the side view of a layer rearranging unit.

According to FIG. 1, a loading bridge 2 is movable along the rot location 1 on a main bridge 3 extending vertically relative to the drawing plane. The longitudinally movable loading bridge 2 serves as a guiding device for a bucket conveyor 5 which is movable at the latter (in a manner not shown) and advisably swivelable around an axis 4.

In all events, the tabular stack 6 is ripened after a period of time to the extent that a shifting of layers and possibly an additional moistening is necessary for the purpose of a positive reinforcement of the rotting process. For this purpose, the bucket conveyor 5 comprises a sloping scraper portion 8 which conveys in an upward direction, wherein the conveyor 5 works as a bucket scraper. The conveyor 5 comprises a deflecting area 9, wherein the inclination of the portions 8 and 10 are selected in such a way that the conveyed material is substantially conveyed upward in the buckets, ejected or unloaded in the area of the upper deflection, and transferred to another conveyor 11 constructed as a belt conveyor.

The belt conveyor 11 is supported at the loading bridge 2 in a manner not shown and is movable with the latter. However, it is advisable to provide at least one other belt conveyor 12 which is displaceable in a telescoping manner from the work position shown in solid lines into at least one rest position 12' shown in dash-dot lines. The arrangement shown in FIG. 1 even shows a third belt conveyor 13 which is displaceable into a rest position (in dashes) in a telescoping manner. This arrangement allows the new pile 7 or stack to be piled up with height adjustment as described in the following, wherein the belt conveyor 12 and 13, respectively, need only be moved over the difference between Lmax and Lmin.

It is known that the stack volume is considerably reduced in the course of the compost ripening. If e.g. the initial volume of garden and biological waste is 100% before the rotting, the volume of the ripe compost is approximately 40%-60% after approximately 10 to 12 weeks.

Without a compensation of the rot loss, the height of the tabular stack at a constant rotting surface would decrease as follows (approximately 7% rot loss between every rearrangement of layers):

assuming the tabular hill height of the primary stack = 3.00 m
after approximately 10 days (first rearrangement of layers) = 2.75 m
after approximately 20 days (second rearrangement of layers) = 2.50 m
after approximately 70 days (seventh rearrangement of layers) = 1.50 m.

The system, according to the present invention, has the positive effect that the height H is held constant with changeable volume and considerable surface area can accordingly be saved.

Figure 2:
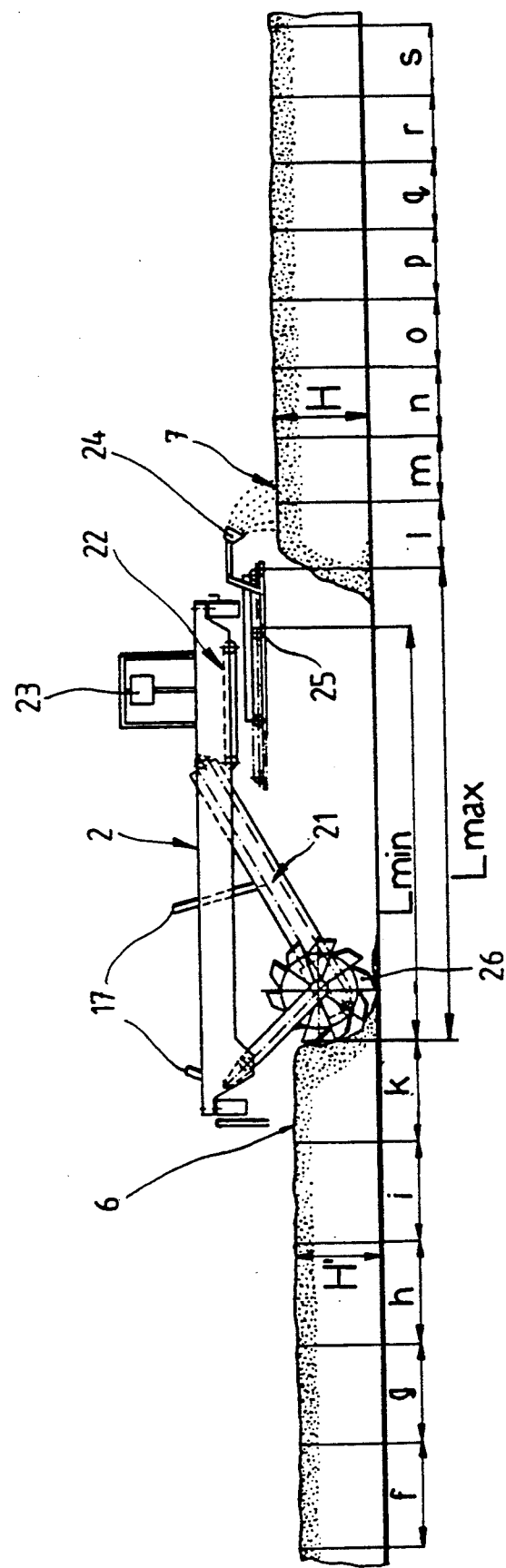
FIG. 2 shows a second embodiment example of the mobile layer rearranging unit during use in the central area of a tabular stack, in longitudinal section.

As is shown in a somewhat exaggerated manner in FIG. 2, the respective old stack 6 is piled up with the new invention to a height like that at the beginning of the ripening to form a new pile 7. Due to the telescoping displacement of the belts, the height difference of the tabular hill H to H' = approximately 7% is compensated for, i.e. the tabular hill is again brought to a height of 3 m during every rearrangement of layers. At constant width this amounts to a total tabular hill length of only 75%, i.e. the required surface area is only 75% relative to a rot system without rot loss compensation.

If, for example, the length of the tabular stack amounts to 100 m and a rot loss of 7% is assumed within the time period from one rearrangement of layers to the next, the tabular stack is shortened by 7 m when the layers are rearranged and is shifted in the discharging direction by 7 m in addition in such a way that the 7 m on the discharge side is discharged via the discharge belt 14, but the tabular stack still has a length of 86 m after the rearrangement of layers and a new primary stack having a length of 14 m can accordingly be put into the input area. Assuming a minimum work distance of 7 m from working to ejection, a maximum work distance of 14 m results, that is, a ratio of 1:2.

In order to maintain an automatic flow of the composting system, it is also advantageous if the product can be discharged automatically from the rot shed 20 at the end of the rotting.

FIG. 1 shows the completely ripened compost (the pile 7) symbolically as a trapezoidal stack. A substantial advantage of the invention consists in that the completely ripened compost is no longer piled up on the rot location 1, but is discharged for further preparation, e.g. fine screening, etc. For this purpose, a stationary discharge belt 14 is arranged at the end of the rot location 1. The telescoping of the conveyor system, belt conveyors 11, 12, and 13, which can be changed with respect to length, are controlled in this instance in such a way that the discharge belt 14 is movable transversely with its outer ejection end 13' being stationary over a longitudinal gutter 15. The position shown in FIG. 1 shows the end of the product discharge phase. This means that the change in length Lmax minus Lmin was utilized in this instance in order to bring the ripe compost with the conveyor 5 from an increasingly greater distance while the ejection location remains constant with reference to the rot length. The conveyor 5 executes a complete transverse movement and will carry out the next transverse movement in a "stepwise" manner by one step deeper into the stack. The distance adjustment can likewise be effected in a stepwise manner.

The bucket conveyor 5 can be raised and lowered, which is also important. In order to transport the conveyor 5 along the piled up tabular hill, it is advantageous that the conveyor 5 be movable from the work position shown in solid lines into the position 5' shown in dash-dash-dot lines. This movement, per se, can be a translational movement, but a swiveling movement around the axis 4 is easier to carry out and more favorable in terms of construction. The construction can be effected corresponding to FIG. 2, wherein the longitudinally movable loading bridge 2 is provided with at least one piston-cylinder unit 17 by means of which the swiveling movement around the axis 4 can be effected.

Another embodiment form of the layer rearranging unit is shown in FIG. 2. A lift-over belt 21 transfers the material directly to a horizontal conveyor which is constructed as a belt weigher 22. The material is weighed continuously by means of the belt weigher 22. The continuous weighing has two special advantages. On the one hand, a deficient water content can be calculated together with a measuring unit for the water content of the compost and the required water can be added directly to the area of the ejection location via a moistening device 24 in any desired form, either as water, percolating water or sewage sludge, depending on the ripeness of the compost. The longitudinal displacement is effected in this instance with a longitudinally movable reversing conveyor belt 25. Since the reversing conveyor belt 25 can eject on both sides, the distance for the longitudinal displacement can be reduced and the complete longitudinal displacement can nevertheless be achieved. It is possible to add water at the ejection points on both sides of the reversing conveyor belt 25.

The working means are constructed here as digging and conveyor wheels 26 which operate in an upward direction. The digging and conveyor wheels 26 operate in a manner substantially identical to that of the bucket conveyor 5 of FIG. 1. With materials which are simple to re-layer, such as household compost, a higher layer rearranging output can be achieved with the digging and conveyor wheels 26. FIG. 2 shows the layer rearranging unit in the middle area with reference to the length of a rotting matter surface, wherein the compensation of the rot loss from H' to H is clearly shown. The tabular stack is brought to the maximum height again after the rearrangement of layers. The old and new stacks are divided into fields (old:) f, g, . . . k, (new:) l, m, . . . s. To this extent, all necessary parameters will accordingly be controllable in portions in a logical manner, also with respect to the addition of water and possibly air feed from the rot floor (FIG. 9), wherein a plurality of fields can be combined for the air guidance.

Figure 3:
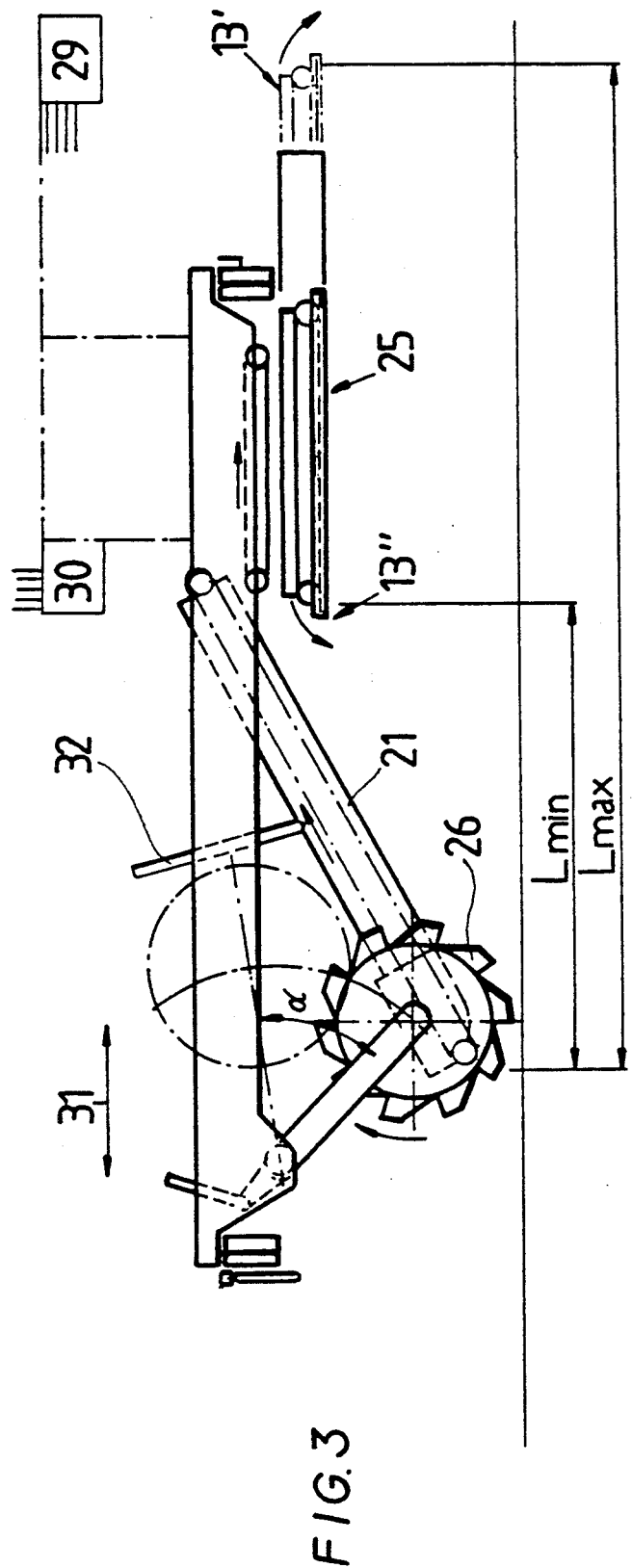
FIG. 3 shows the mobile layer rearranging unit of FIG. 2 in enlarged scale.
Figure 4:
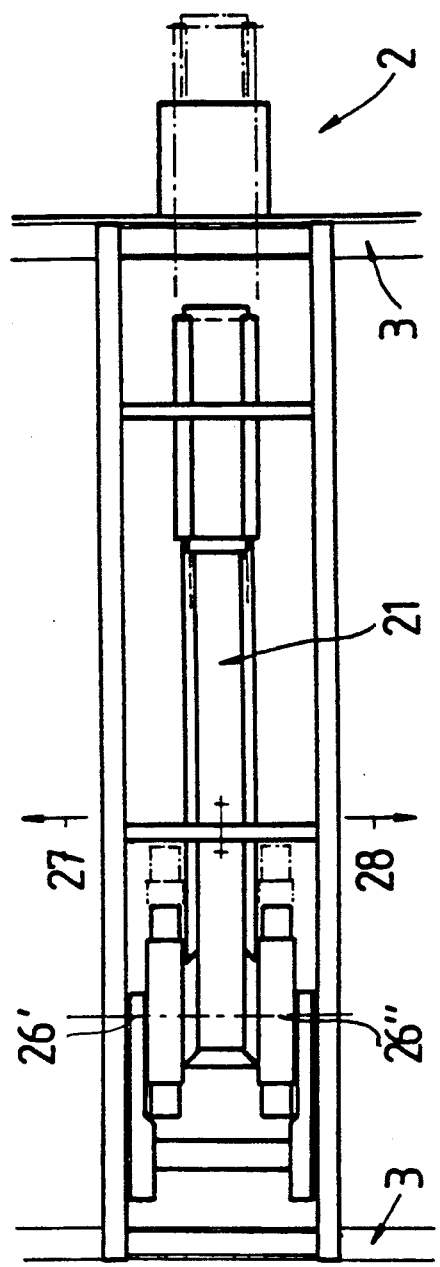
FIG. 4 shows an outline of FIG. 3.

As can be seen from FIGS. 3 and 4, the working device is constructed as a double-digging and conveyor wheel 26' and 26", wherein the two conveyor belts are arranged at both sides of the lift-over belt 21 and eject the material onto the latter. The digging and conveyor wheels 26 perform half of the lifting over of the material with their upwardly working shovels, the rest of the lift-over work is done by the lift-over belt 21. The loading bridge 2 is movable in the transverse direction according to arrows 27 and 28 on the main bridge 3. The entire layer rearranging unit, including the longitudinally adjustable conveyor system, is movable in the longitudinal direction, arrow 31, as a mobile layer rearranging unit which is remote-controlled via a central computer 29 according to the requirements of the working. It is important that all substantial control commands can be carried out not only via programs which are storable in the central computer 29, but which can likewise be entered in situ via an in-situ control device 30.

Basic programs can accordingly be adjusted in situ by the system maintenance personnel over a certain period of time and simultaneously filed in the central computer 29. Thus, specific characteristics as well as cyclical changes such as seasons can be empirically determined and filed via the program and retrieved at any time. However, the entire flow can just as easily be directly controlled in situ by the system maintenance personnel for whatever reason. The double-digging and conveyor wheels 26 can be raised together with the lift-over belt 21 at an angle o with a rotting matter working lifting- and-lowering device 32 and lowered to the ground or, in special cases, to any desired working height.

Three different work phases are shown schematically in FIGS. 5, 6 and 7. The primary stack 40 is erected on the left-hand side of the drawing in FIG. 5 by means of an input belt 42 (phase A). This can be effected e.g. over a time period of 2 days. The complete independence of the mobile layer rearranging unit 35 is a very great advantage, since both generally have a completely different work rhythm. The mobile layer rearranging unit 35 is in the work position for automatic discharge on the stationary discharge belt 14 on the other end side of the tabular stack 6, the ripe compost material being conveyed from this work position to a fine preparation line. In so doing, only the end stack 41 is discharged. The location for the ejection place remains constant over the discharge belt 14 in this case; on the other hand, the mobile layer rearranging unit 35 moves, according to arrow 31, in the direction of the tabular stack 6. The ejection belt 25 is simultaneously displaced relative to the mobile layer rearranging unit 35, so that the work distance LA from the working location to the ejection location is increased according to the progress of working.

FIG. 6 shows the actual rearrangement of layers in the first phase (B). The mobile layer rearranging unit 35 has a position LN which can be designated the normal work phase. Depending on this, the ejection can be effected toward the inside from the beginning as in FIG. 6, and can then change to the outside. It is possible to provide the addition of water in both ejection directions. The mobile layer rearranging unit 35 moves in the direction of arrow 31'.

FIG. 7 shows the end of the rearrangement of layers and the beginning of the return movement of the mobile layer rearranging unit 35. The digging and conveyor wheels 26 are lifted to the highest position and the mobile layer rearranging unit 35 moves to the right according to arrow 31, returns along the tabular stack 6 into the position in FIG. 5 and begins again.

Figure 8:
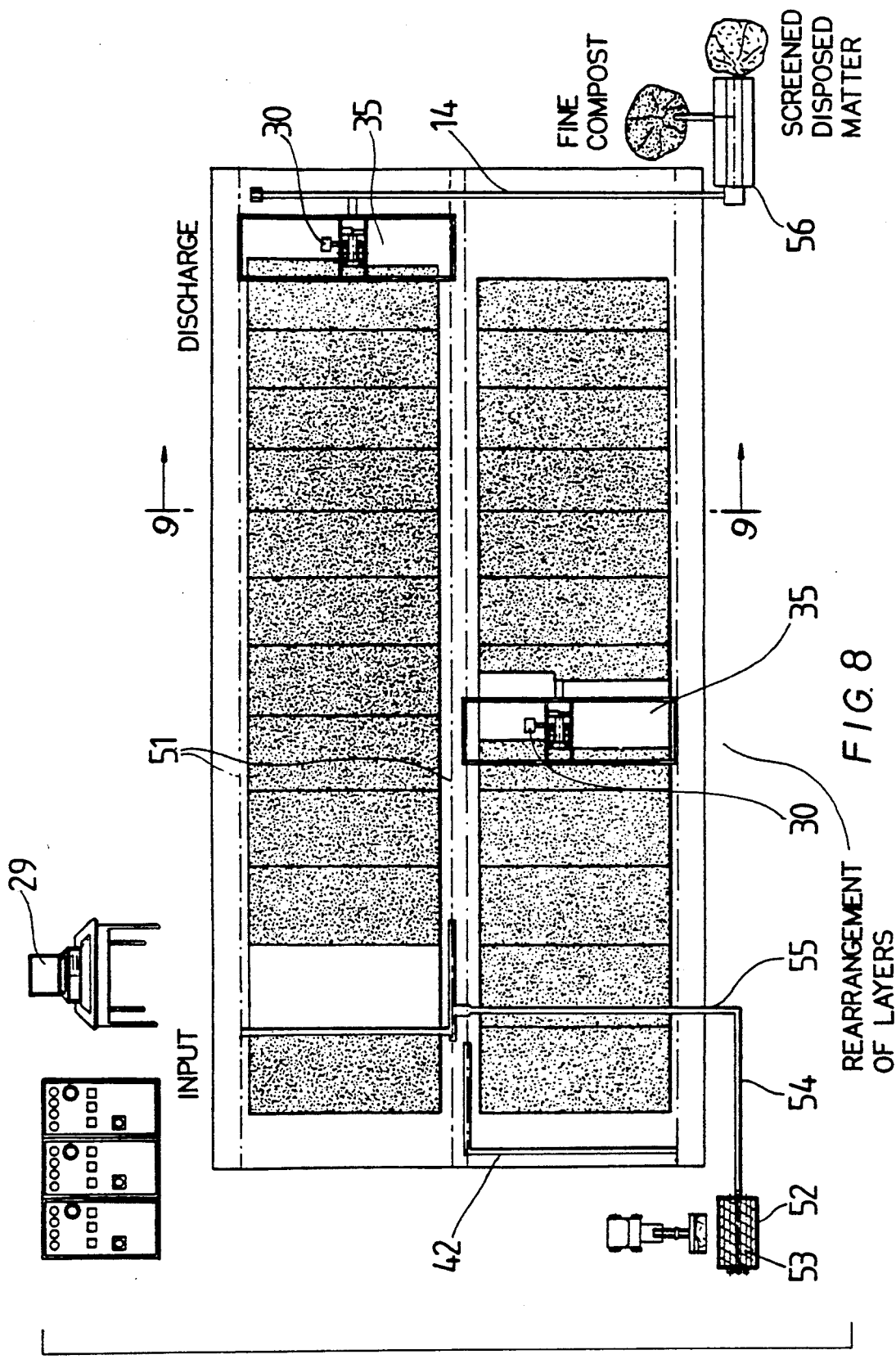
FIG. 8 shows a compost system with two adjacent rots.

FIG. 8 shows a section of a larger compost system in a schematic manner which comprises two adjacent tabular stacks. Of course, a desired number of tabular stacks can be arranged in a row. For example, preferably five stacks can be combined to form a larger automatic composting system. In so doing, an active weekly rhythm of 5 days can be maintained for the rearrangement of layers and the ripe compost can be continuously discharged at least from one stack.

Every tabular stack is laterally defined by two longitudinal walls 50. The longitudinal walls 50 are equipped with a craneway 51 (see also FIG. 9) on which the mobile layer rearranging unit 35 is arranged so as to be longitudinally movable. The raw compost is tipped into a take-up gutter 52 which comprises a worm mill unit 53 in the lower outlet area. The coarsely crushed material is transferred by means of a lift-over conveyor 54 to a distributing belt 55 which feeds the respective inlet belt 42 in use at the moment. The discharge belt 14 transfers the ripe compost to a fine line 56 in which the compost material is screened for the respective application purpose, freed of noxious foreign matter and e.g. delivered in bag packaging. In particular cases of application the compost material can be delivered to the corresponding user at an intermediate degree of ripeness (arrow 57). In order that the system can be operated in a fully automatic manner, a central computer 29 for the coordination of all control commands is assigned and an in-situ electronic equipment 30 is assigned to every mobile layer rearranging unit 35. In favorable cases, the entire compost system can be operated in a completely automatic manner in this way; the system maintenance personnel can nevertheless intervene at any location and make adjustments for the work cycle or optimize the latter. In the case of failure of the control, the latter is conceived in such a way that every significant work unit, particularly the mobile layer rearranging unit 35, is controllable at any time with its own in-situ electronic equipment 30 independently of the central computer 29.

Figure 9:
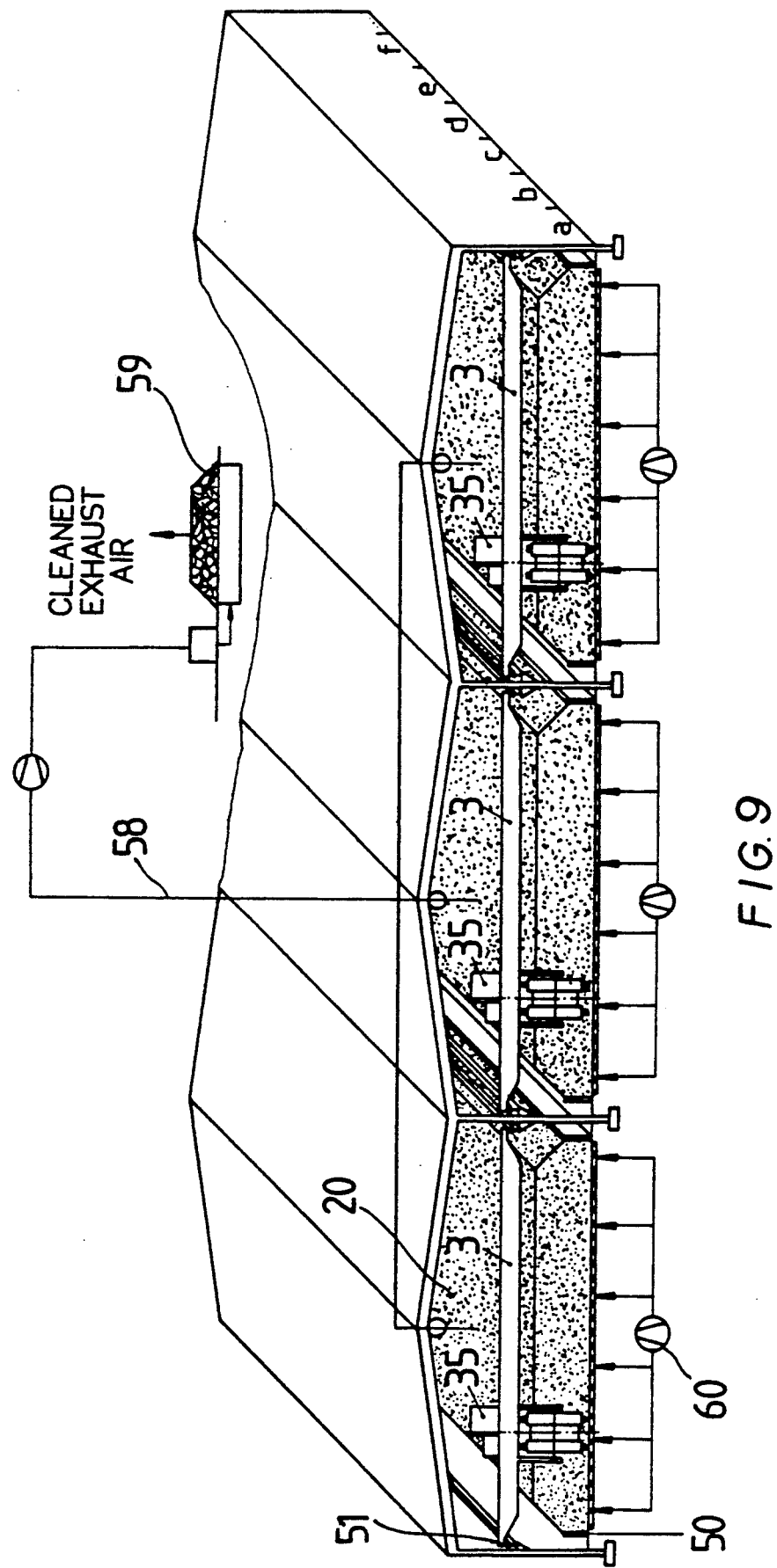
FIG. 9 shows a section IX—IX of FIG. 8, but with three roof-covered tabular stacks.

Three completely roof-covered tabular stacks are shown in FIG. 9. Each tabular stack has its own mobile layer rearranging unit 35 arranged over it, wherein the transverse movability is shown, the latter being necessary, since, logically, working as well as ejection only occur on a fraction of the width of the tabular stack.

The rot location 1 comprises a ventilation system 60 which blows air into the tabular stack from the ground surface. The length of the tabular stack is preferably divided into a larger number of fields a, b, c, d, etc. in which a controlled air quantity is fed. The exhaust air is guided through an exhaust air filter 59, known per se, via an exhaust air system 58 for the purpose of cleaning.

While the foregoing description and drawings represent the preferred embodiments of the present invention, it will be obvious to those skilled in the art that various changes and modifications may be made therein without departing from the true spirit and scope of the present invention.

What is claimed is:

1. A composting system for the production of compost of different degrees of ripeness by repeated rearrangement of layers of a tabular stack, comprising:
   a controlled layer rearranging unit, which is movable in longitudinal and transverse directions over a tabular stack and which defines a take-up location for picking up rot, layer by layer, from the tabular stack and a depositing location, positioned a distance from the take-up location, for depositing each layer, said rearranging unit comprising:
   a) take-up means for working the rot at the take-up location which operates in an upward direction, said controlled layer rearranging unit including means for lifting and lowering said take-up means and means for also moving the take-up means in a crane-like manner;
   b) a conveyor system, said conveyor system providing a means for transporting the rot picked-up by the take-up means, at the take-up location, to the deposit location, the conveyor system being moveable in a crane-like manner over the rot and adjustable in effective length so as to enable the distance between take-up and depositing locations to be changed, said conveyor system comprising at least two conveyors extending substantially in a horizontal direction between and take-up depositing locations and being longitudinally displaceable relative to one another; and,
   c) control means for selectably adjusting the effective length of said conveyor system.

2. The composting system of claim 1 further comprising a process computer for providing control of the operation of said composing system, said process computer allowing selection of a stored program from a number of different programs stored therein for automatic operation of the composting.

3. The composting system of claim 2 wherein the process computer has stored therein a program for compensation of rot losses.

4. The composting system of claim 2 further comprising means for measuring water content of the rot and means for providing a continuously controlled feed of liquid to the rot.

5. The composting system of claim 4 comprising a continuous flow weighing system so that the liquid feed for a respective rot field by evaluation of the material through out, the water content determined by the water content measuring means and the desired water content predetermined by the process computer.

6. The computer system of claim 4 wherein means for providing liquid provides the continuously controlled feed of liquid in the depositing location.

7. The composting system according to claim 2 wherein each tabular stack is defined by two longitudinal walls and the take-up means is moveable longitudinally and transversely in a crane-like manner according to a pre-selectable program.

8. The composting system of claim 1 wherein the conveyor system further comprises a plurality of horizontal conveyors and the adjustability of the effective length of the conveyor system permits adjustment of the minimum and maximum distance between the take-up location and depositing location, Lmin and Lmax, respectively in a ratio of Lmin:Lmax from 1:1.2 to 1:3.

9. The composting system of claim 8 wherein the ratio of Lmin:Lmax is from 1:1.5 to 1:2.5.

10. The composting system of claim 9 wherein the ratio of Lmin:Lmax is approximately 1:2.

11. The composting system of claim 1 wherein at least one conveyor has a reversible conveying direction.

12. The composting system of claim 1 wherein the take-up means comprises a scraper conveyor device which conveys in an upward direction.

13. The composting system of claim 1 wherein the take-up means comprises a bucket conveyor, having upwardly working digging and conveyor wheels.

14. The composting system of claim 1 wherein the take-up means is constructed as a double digging or conveyor wheel and includes a sloping conveyor.

15. The composting system of claim 1 further comprising a continuous flow weighing system for the weighing of the rot which operates in the area of the conveyor system.

16. The composting system of claim 15 wherein the continuous flow weighing system comprises a belt weigher.

17. The composting system of claim 1 further comprising stationary transverse conveyor or belt for operating at the depositing location of the composting system, wherein the depositing location is correspondingly constant in the longitudinal direction whereas the take-up location is selectable.

18. The composting system of claim 1 wherein the floor of the composting system comprises a plurality of ventilation fields with a supply of air provided in the longitudinal direction by a controlled air supply, the composting system being enclosed and wherein a biofilter is provided for cleaning the exhaust air.

19. In a composting method for the automatic production of compost of different degrees of ripeness employing a crane-like controlled layer rearranging unit which moves in longitudinal and transverse directions over a tabular stack and which defines a distance between a compost take-up location and a compost depositing location, the improvement comprising the step of programming the distance between the take-up and depositing locations to compensate for rot losses.

20. The composting method of claim 19 further comprising the step of building up the tabular stack by independent mechanical means and controlling said independent mechanical means to coordinate with the rearrangement of layers.

* * * * *